US005498115A

United States Patent [19]

Perneborn

[11] Patent Number: 5,498,115

[45] Date of Patent: Mar. 12, 1996

[54] DISTRIBUTOR FOR PARTICULATE MATERIAL

[75] Inventor: Robert Perneborn, Göteborg, Sweden

[73] Assignee: Mölnlycke AB, Göteborg, Sweden

[21] Appl. No.: 140,001

[22] PCT Filed: Apr. 24, 1992

[86] PCT No.: PCT/SE92/00270

§ 371 Date: Nov. 3, 1993

§ 102(e) Date: Nov. 3, 1993

[87] PCT Pub. No.: WO92/19388

PCT Pub. Date: Nov. 12, 1992

[30] Foreign Application Priority Data

Apr. 24, 1991 [SE] Sweden .................................. 9101238

[51] Int. Cl.[6] .................................................... B65G 65/46

[52] U.S. Cl. .......................... 414/326; 198/671; 414/287; 414/288; 222/413

[58] Field of Search .................................... 414/526, 326, 414/325, 288, 287, 304, 310–312, 318–321; 198/671; 222/413, 412

[56] References Cited

U.S. PATENT DOCUMENTS

| | | | |
|---|---|---|---|
| 2,003,417 | 6/1935 | Andreas | 414/287 X |
| 2,630,906 | 3/1953 | Philipp | 198/671 X |
| 2,731,969 | 1/1956 | Hoeksema | 198/671 X |
| 4,024,985 | 5/1977 | Iinoya et al. | 414/288 X |
| 4,983,090 | 1/1991 | Lehmann et al. | 414/326 |

FOREIGN PATENT DOCUMENTS

| | | | |
|---|---|---|---|
| 0030342 | 6/1981 | European Pat. Off. . | |
| 0168196 | 1/1986 | European Pat. Off. . | |
| 0235433 | 9/1987 | European Pat. Off. . | |
| 0282683 | 9/1988 | European Pat. Off. . | |
| 1232497 | 10/1960 | France | 222/413 |
| 3736582 | 5/1988 | Germany | 198/671 |
| 242000 | 11/1985 | Japan | 198/671 |
| 243514 | 10/1991 | Japan | 198/671 |
| 641558 | 8/1950 | United Kingdom | 414/326 |
| 81/02723 | 10/1981 | WIPO . | |

*Primary Examiner*—Frank E. Werner
*Attorney, Agent, or Firm*—Burns, Doane, Swecker & Mathis

[57] ABSTRACT

The present invention relates to a distributor for particulate material comprising a cylinder and a feeder screw mounted therein for conveying particulate material in the cylinder from an inlet to an outlet.

24 Claims, 3 Drawing Sheets

DISTRIBUTOR FOR PARTICULATE MATERIAL

The present invention relates to a distributor for particulate material comprising a cylinder and a feeder screw mounted therein for conveying particulate material in the cylinder from an inlet to an outlet.

Distributors for particulate material such as powders, granules, granulates, flakes, fibres, and the like can be used in a number of different industrial applications. For example, it is usual in the industrial manufacture of absorbent products, such as diapers, to add so-called superabsorbents when forming the mat of a fluffed cellulose. The term "superabsorbent" is a general name for polymer material which have a liquid absorbing capacity many times greater than their own weight. Superabsorbents usually have one of the abovementioned particulate forms, the powder form being especially common. The particulate material is usually in a substantially dry state during the process steps which lead up to the particulate material being fed out of the distributor and mixed into or otherwise incorporated in an absorbent body of, for example, fluffed cellulose. The term "substantially dry state" means in this case that no liquid has been added to the particulate material, the only possible liquid present being the contribution from the moisture in the surrounding air. It is undesirable that the superabsorbent material should absorb liquid during the manufacturing state of the absorbent body, since this would impair the functioning of the superabsorbent material when the finished product is to be used later. It is therefore desirable that the superabsorbent material be distributed in a dry state.

The distribution of dry particulate material, for example superabsorbents, on a surface or in a body, involves problems. The surface can, for example, consist of a moving fluff web and the body can, for example, consist of an absorbent body of fluff fibres. In the first place, the distributing device for the dry particulate material must be suited for distributing dry material. Secondly, it is essential that the superabsorbent material can be advanced in a continuous flow, and that this flow can be distributed evenly either over the surface if one wishes to make a superabsorbent coating or inside the absorbent body into which one wishes to mix the superabsorbent. "Evenly" in this case does not mean that the entire surface of the web of material must be coated with particulate material. Rather, it is sufficient that the or those portion(s) of the web which are coated has/have an even surface coating. It is of course possible to coat the entire material web with particulate material if so desired. The same applies to three-dimensional mixing of particulate material into the absorbent body. It is possible that certain portions of the absorbent body can completely lack particulate material, but those portions of the body where the particulate material is present should have a substantially even distribution of particles, either in one plane inside the absorbent body or in all dimensions of the body.

Distributors designed to produce an evenly distributed flow of particles over a surface are previously known. EP 0 168 196 describes, for example, a device comprising a nozzle for spreading particles conveyed in a stream of gas on to a moving porous web, providing a broad particle flow. Such a nozzle has, however, a smaller cross-sectional area at its outlet than at its inlet. If the nozzle is used to distribute particles in a process step, such as mat forming processes, there is a risk that pulp fibres will enter the nozzle via reverse suction or in another unintended manner. Inside the nozzle, the fibres can accumulate and thereby block the outlet of the nozzle. It is also known to distribute dry particulate material by means of a screw conveyer, for example Model 600 marketed by Accurate Dry Material Feeders Inc., WI, USA. From a hopper, the material is advanced by the feeder screw and out through the outlet at the outlet end of the feeder screw, in a small string. This does not, however, provide an even transverse distribution of the feeder flow; rather it provides a narrow concentrated flow.

The present invention is intended to provide a device for achieving an evenly distributed feeder flow of dry particulate material, which flow can be used either for even particle coating of a surface or even particle distribution in an absorbent body.

In order to achieve this, a device of the type described by way of introduction is characterized in that the outlet comprises an elongated opening in the lateral wall of the cylinder, said opening extending in the longitudinal direction of the cylinder.

According to one embodiment of the invention, the outlet opening is inclined relative to a generatrix of the cylinder wall with the highest end of the outlet opening directed towards the inlet end of the cylinder.

According to another embodiment of the invention, the outlet opening consists of a slot of uniform width, which can be arcuate.

According to another aspect of the invention, a plurality of elements for collecting and further conveyance of the distributed particulate material are arranged near the outlet, said elements having a collecting portion, preferably in the form of a funnel or the like, and a subsequent conveyance portion arranged in connection with the collecting portion.

According to an additional embodiment of the invention, the conveyance portion has essentially the same cross-sectional area along its entire length.

According to one embodiment of the invention, the conveyance portion consists of a hose, a tube or the like, preferably with substantially circular cross-section.

According to another embodiment of the invention, a conveyance plate in the form of an inclined plane is mounted in direct connection with the outlet of the screw conveyor.

According to an additional embodiment of the invention, the elongated outlet opening consists of a plurality of openings arranged in series in the longitudinal direction of the outlet.

The advantages of a distributor for particulate material according to the present invention are numerous.

The invention can be used to create a transversely distributed particle flow which can either be applied as an even surface coating on a moving web of material or be mixed evenly into an absorbent body. In the latter case, the mixture can be performed evenly either in two or three dimensions.

One advantage of a device according to the invention is that the outlet of the screw conveyor is relatively long so that a relatively broad flow is obtained. A broad flow makes it possible to provide an even coating of a surface, for example a moving web of material, with particulate material. It is also an advantage to use a screw conveyor, since a conveyor of this type is suited to advancing in dry particulate material. A distributor of particulate material in accordance with the present invention makes it also possible to arrange conveyance lines in connection with the broad outlet of the screw conveyor. Said conveyance lines can transport the broad outflow from the screw conveyor outlet to another place while retaining the transverse distribution. The advantages of this are that the screw conveyor need not be placed in the immediate vicinity of the narrow and difficultly accessable mat forming area, which can consist of a mat forming drum with associated equipment. Furthermore, a plurality of flows are obtained from the conveyance tubes, which emanate from the same screw conveyor. Alternatively, the number of screw conveyors can be equal to the number of conveyance tubes leading to the mat forming zone, but this increases the cost of the distributor due to the additional screw conveyors. Furthermore, the possibilities are increased for varying the mixing ratio between the particulate material and the cellulose fluff, by virtue of the fact that the outlets of the conveyance tubes can be placed at a number of selected distances from the mat forming moulds on the mat forming drum, and in a number of different configurations relative to each other. If the conveyance tubes also have the same cross-sectional area along their entire length, including the outlet, there will be no constrictions anywhere which could give rise to blockages due to pulp particles accumulated in the conveyance tubes, as in the previously known flat nozzles. The construction of the conveyance tubes is thus well adapted to the working environment in which they are intended to operate.

The invention will be described below in more detail with reference to examples shown in the accompanying drawings.

Figure 1:
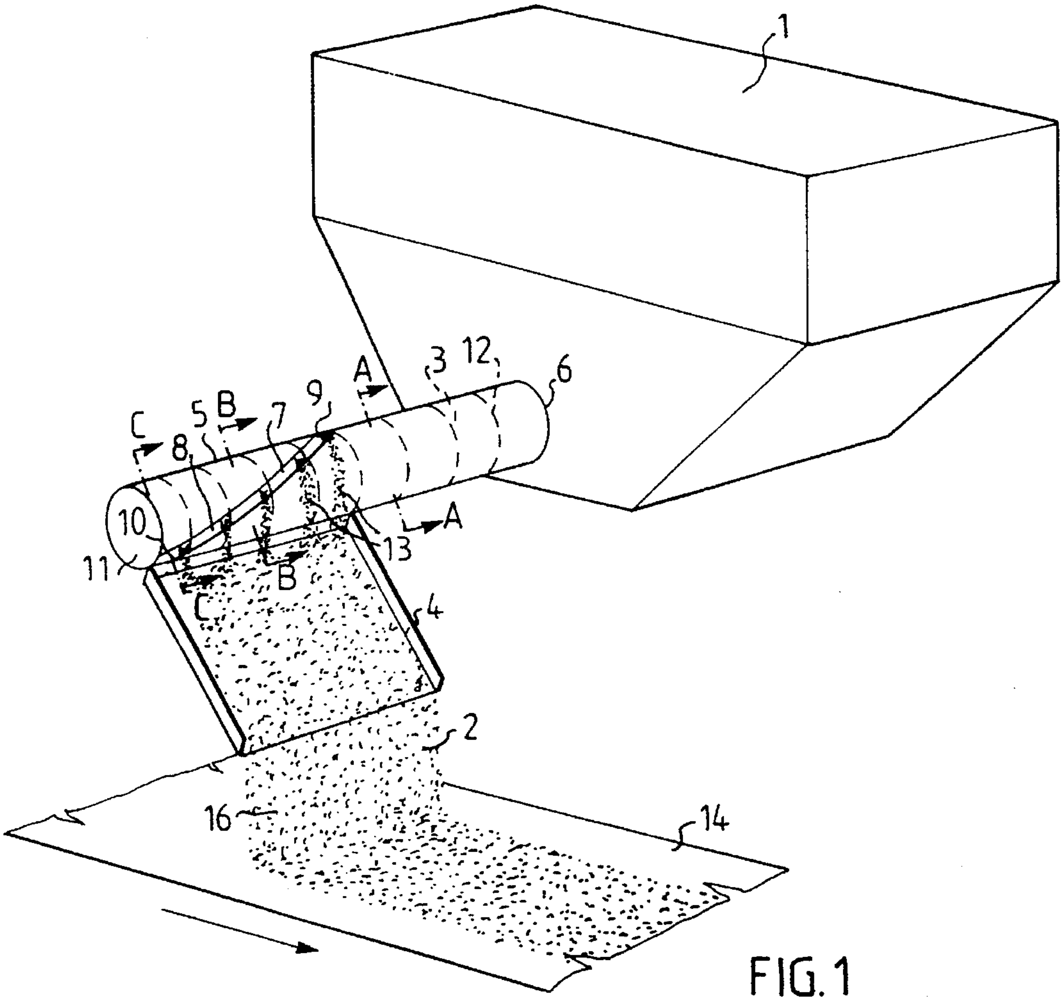
FIG. 1 shows in perspective view one embodiment of a device according to the invention.

FIG. 1 shows a device for distributing a dry particulate material, for example powder, flakes, granulates, granules, fibres or the like. The device is especially designed for distributing superabsorbents in one of the above-mentioned forms. The device comprises a hopper 1 for superabsorbents in powder form 2, a screw conveyor 3 for feeding the powder 2 from the hopper 1 to a conveyance plate 4 in the form of an inclined plate for collecting and even distribution of the powder 2. Conveyance tubes for supplying the superabsorbent powder to the hopper 1 are not shown in the Figure, nor is the other equipment shown which is required for operating the device, such as motors for driving the screw conveyor.

The powder when conveyed is substantially dry, i.e. in addition to the effect of the surrounding ambient humidity, there is no added moisture. Feeding moist powder or other solid particulate material by means of the screw conveyor is quite difficult and other methods and devices must in that case be used to obtain a satisfactory result.

The screw conveyor is arranged inside the cylinder 5, which has an inlet 6 at its end adjacent the hopper 1 and an outlet 7 which is elongated and consists of a slot 8 in the lateral surface of the cylinder in the longitudinal direction thereof. As shown in FIG. 1, the cylinder can be fixedly mounted to the hopper. The slot 8, which is arcuate, extends from a highest position at the slot end 9 closest to the inlet 6, to a lowest position at the other distal end 10 of the slot. The latter distal end 10 is disposed near the distal end 11 of the cylinder 5, i.e. the end farthest away from the hopper 1. The distal end 11 of the cylinder is completely encapsulated so that no powder can be fed out that way.

The arcuate shape of the slot 8 is adapted to the conveyance properties of the powder, i.e. its capacity to flow. The slot 8 is not necessarily arcuate; it can also be straight. The incline of the slot is dependent on the length of the outlet 7, which is in turn dependent on the desired transversed distribution or extent of the outflow.

The threads 12 of the feeder screw are indicated by dashed lines inside the cylinder 5. When the screw 3 rotates, the superabsorbent powder 2 will be advanced towards the outlet 7 by the threads 12 inside the cylinder 5, whereafter the powder 2 will be successively fed out through the slot 8 in a number of vertical flows 13 spaced along the entire length of the slot.

The powder flows shown in FIG. 1 are to be regarded as a simplified momentary picture of the actual distributing process where the flows are more diffuse in shape. The flows move along the outlet 7 as the screw 3 rotates so as to obtain an even distribution of discharged material along the cylinder 5.

The powder flows 13 fall down onto the inclined plate 4, where they are mixed with each other and fall down as an even powder curtain 16 onto a web 14 of material, which is moving in the direction of the arrow.

In this manner, one has achieved by means of the screw conveyor an even particle coating of a surface of the moving material web. In the example shown, the particle coating is continuous in a central strip of the material web, but according to another process described in a co-pending patent application, a masking web inserted between the inclined plate 4 and the material web 14 makes it possible to obtain pre-determined discrete particle-coated areas on the material web 14.

Figure 2:
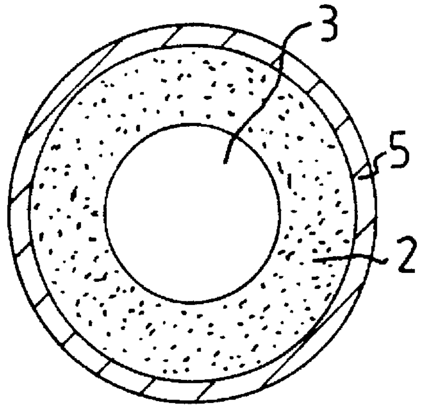
FIG. 2 shows a section along the line A—A in FIG. 1.
Figure 3:
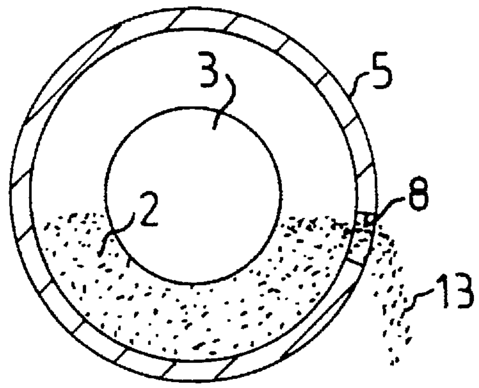
FIG. 3 shows a section along the line B—B in FIG. 1.
Figure 4:
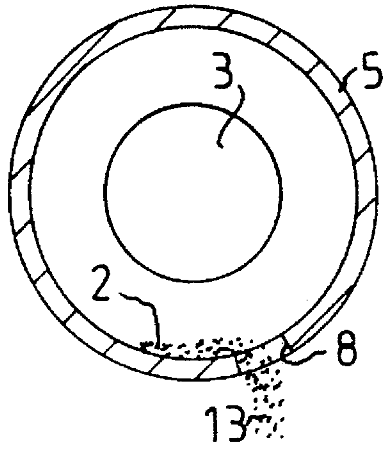
FIG. 4 shows a section along the line C—C in FIG. 1.

FIGS. 2–4 show a section through the cylinder 5 along the lines A—A, B—B and C—C, respectively, in FIG. 1, and how the superabsorbent powder 2 is successively fed out through the slot 8.

The feeder screw itself is symbolized in the FIGS. 2–4 by a round ring.

FIG. 2 shows how the powder 2 is advanced in the cylinder 5 at a stage before it has reached the slot 8. In FIG. 3, the feeder screw 3 has advanced the powder 2 approximately half of the length of the slot, and about half of the particles have already been fed out into the powder flow 14. FIG. 4 shows how the distribution has almost reached the distal end 10 of the slot 8 and thereby its lowest position, whereupon the last particles 2 are fed out through the slot 8.

The distal end 10 of the slot 8 is placed in the example shown at the lowest point of the cylinder. This ensures that all of the particulate material conveyed by the feeder screw will be fed out of the cylinder through the slot 8 and this prevents particulate material from being collected at the outlet end 11 of the cylinder in the space below the lowest end of the slot, which would otherwise disturb the even distribution of the flow of particles fed from the slot.

Figure 5:
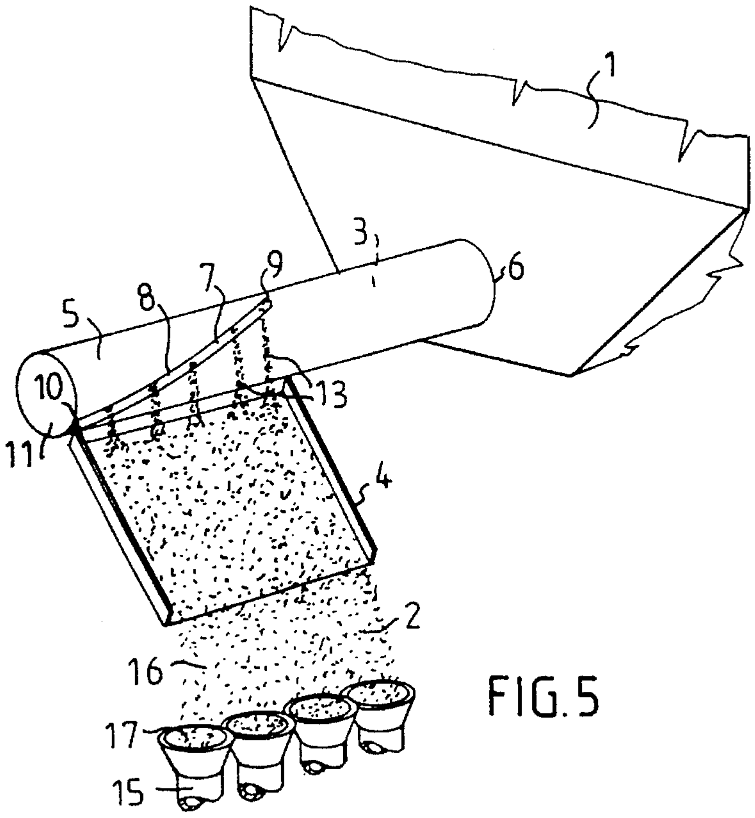
FIG. 5 shows in perspective a portion of a second embodiment of a device according to the invention.
Figure 6:
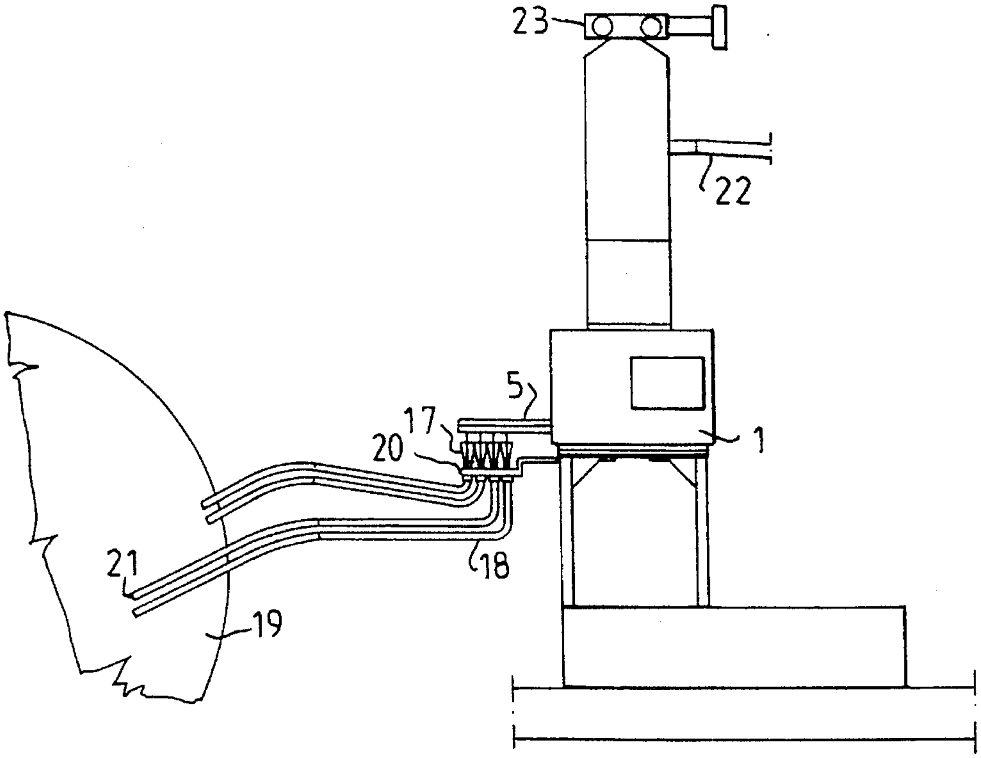
FIG. 6 shows schematically the embodiment in FIG. 5 in its entirety.

A second embodiment of the invention is shown in FIGS. 5 and 6. Instead of allowing the particles to fall down and coat a surface of a material web, for example, as in FIG. 1, four collecting and conveyance elements 15 are arranged under the inclined plate 4. These elements 15 have a collecting portion 17, for example a funnel, and a subsequent conveyance portion 18 arranged in connection with the collecting portion 17. FIG. 5 shows how the powder curtain 16 falls down into the collecting portions 17.

FIG. 6 shows schematically a device in its entirety and how the conveyance portions 18 lead to a mat forming zone 19 on a machine, for example for manufacturing diapers. In order to facilitate the conveyance of the superabsorbent powder in the conveyance portions 18, which are for example hoses, tubes or the like, an ejector 20 is arranged between the collecting portion 17 and the conveyance portion 18.

By arranging the openings 21 of the conveyance portions 18 at suitable locations within the mat forming zone 19, it is possible to obtain the even distribution in the absorbent body which is desired. A spreading of the openings 21 vertically relative to the mat forming zone provides an essentially even three-dimensional distribution of the superabsorbent powder in the absorbent body formed, while a concentration of the openings 21 in the mediate vicinity of the mat forming moulds (not shown) provides an even layer application within the absorbent body.

The conveyance portions are constructed so that they have essentially the same cross-sectional area along their entire length. The cross-section is preferably circular, but the most essential feature is that there will be no constrictions.

FIG. 6 also shows schematically an inlet 22 for the superabsorbent powder which comes from a magazine (not shown). A vacuum pump 23 conveys the powder through the feed line 22 to the hopper 1.

The invention is not intended to be limited to the examples shown. Rather, a number of modifications are possible within the scope of the patent claims.

It is, for example, possible to eliminate the inclined plate in those cases where the particulate material is to be further conveyed by means of the collecting and conveyance elements, as shown in FIGS. 5 and 6. It is also conceivable that the outlet of the screw conveyor can be divided into a longitudinal row of small slots, which are separate from each other by remaining portions of the lateral wall of the cylinder. Such a design can have advantages as regards strength, and the remaining portions between the slots can suitably be placed within the areas of the thread crests of the feeder screw.

It is also conceivable that another dry particulate material than superabsorbent powder can be fed by means of a distributor according to the present invention.

I claim:

1. A distributor for particulate material, comprising:

a nonrotating hollow cylinder having an inlet and an outlet therein, said inlet being located at a first end of said cylinder, said cylinder having a closed second end, means for supplying particulate material to said inlet, said means for supplying being fixedly mounted to said nonrotating hollow cylinder, a feeder screw disposed in said cylinder for conveying particulate material in the cylinder from said inlet solely to said outlet, and drive means for rotating the feeder screw in the cylinder, said outlet comprising an elongated opening in a lateral wall of the cylinder, said outlet opening extends in a longitudinal direction of the cylinder and is inclined relative to a generatrix of a cylinder wall with a highest end of the outlet opening directed towards said first end of the cylinder, whereby the particulate material is distributed through the outlet in a plurality of vertical flows spaced along the outlet and moving along the outlet as the feeder screw rotates so as to obtain an even distribution of discharged material along the cylinder.

2. The distributor according to claim 1, wherein a lowest end of the outlet opening is located in the vicinity of the outlet end of the cylinder and substantially in a lowest portion of the cylinder wall.

3. The distributor according to claim 1, wherein the outlet opening consists of a through-slot of uniform width in the wall of the cylinder.

4. The distributor according to claim 3, wherein the slot is arcuate.

5. The distributor according to claim 4, wherein the outlet opening includes a plurality of openings arranged in series in the longitudinal direction of the cylinder.

6. The distributor according to claim 3, wherein the width of the slot varies.

7. The distributor according to claim 3, wherein the outlet opening includes a plurality of openings arranged in series in the longitudinal direction of the cylinder.

8. The distributor according to claim 3, further including a plurality of elements for collecting and further conveyance of the distributed particulate material arranged near the outlet, said elements having a collecting portion, and a subsequent conveyance portion arranged in connection with the collecting portion.

9. The distributor according to claim 3, further comprising a conveyance plate, in the form of an inclined plane, mounted in direct connection with the outlet.

10. The distributor according to claim 1, wherein the outlet opening includes a plurality of openings arranged in series in the longitudinal direction of the cylinder.

11. The distributor according to claim 10, further including a plurality of elements for collecting and further conveyance of the distributed particulate material arranged near the outlet, said elements having a collecting portion, and a subsequent conveyance portion arranged in connection with the collecting portion.

12. The distributor according to claim 1, further including a plurality of elements for collecting and further conveyance of the distributed particulate material which are arranged near the outlet, said elements having a collecting portion, and a subsequent conveyance portion arranged in connection with the collecting portion.

13. The distributor according to claim 12, wherein the conveyance portion has essentially a same cross-sectional area along an entire length of the conveyance portion.

14. The distributor according to claim 13, wherein the conveyance portion includes a hose.

15. The distributor of claim 14, wherein the hose has a substantially circular cross-section.

16. The distributor according to claim 12, further comprising ejectors coupled to inlet portions of the conveyance portions.

17. The distributor according to claim 16, further comprising a conveyance plate, in the form of an inclined plane, mounted in direct connection with the outlet.

18. The distributor of claim 12, wherein the collecting portion is in the form of a funnel.

19. The distributor according to claim 12, further comprising a conveyance plate, in the form of an inclined plane, mounted in direct connection with the outlet.

20. The distributor according to claim 1, further comprising a conveyance plate in the form of an inclined plane, which is mounted in direct connection with the outlet.

21. A distributor for particulate material, comprising:

a nonrotating hollow cylinder having an inlet and an outlet therein, said inlet being located at a first end of said cylinder, said cylinder having a closed second end, means for supplying particulate material to said inlet, said means for supplying being fixedly mounted to said nonrotating hollow cylinder, a feeder screw disposed in said cylinder for conveying particulate material in the cylinder from said inlet solely to said outlet, drive means for rotating the feeder screw in the cylinder, said outlet comprising an elongated opening in a lateral wall of the cylinder, said outlet opening extends in a longitudinal direction of the cylinder and is inclined relative to a generatrix of a cylinder wall with a highest end of the outlet opening directed towards said first end of the cylinder, whereby the particulate material is distributed through the outlet in a plurality of vertical flows spaced along the outlet and moving along the outlet as the feeder screw rotates so as to obtain an even distribution of discharged material along the cylinder, and a conveyance plate, forming an inclined plane and mounted directly adjacent and below said outlet opening.

22. The distributor according to claim 21, wherein said conveyance plate has an upper edge extending transverse to an inclination of said inclined plane, said upper edge further extending along the longitudinal direction of the cylinder a distance at least equal to an extension along the longitudinal direction of the cylinder of said elongated opening.

23. The distributor according to claim 22, wherein said cylinder has a substantially horizontal central axis.

24. The distributor according to claim 21, wherein said cylinder has a substantially horizontal central axis.

* * * * *